(12) United States Patent
Whitlow et al.

(10) Patent No.: US 8,006,982 B2
(45) Date of Patent: Aug. 30, 2011

(54) HIGH TEMPERATURE DYNAMIC SEAL

(76) Inventors: Mark S. Whitlow, Columbia, SC (US); Jeff Noll, Blythewood, SC (US); Kevin Lamb, Columbia, SC (US); Jeffrey D. Farris, Raleigh, NC (US); Fernando Lopez, Torrington, CT (US); Paul Richard Ryan, Carver, MA (US); Roger Sanderson, Canton, MA (US); Mark Vincent Chester, Tiverton, RI (US); Robert Vincent McGovern, Barrington, RI (US)

( * ) Notice: Subject to any disclaimer, the term of this patent is extended or adjusted under 35 U.S.C. 154(b) by 81 days.

(21) Appl. No.: 12/413,203

(22) Filed: Mar. 27, 2009

(65) Prior Publication Data

US 2009/0243219 A1 Oct. 1, 2009

Related U.S. Application Data

(60) Provisional application No. 61/040,499, filed on Mar. 28, 2008.

(51) Int. Cl.
  *F16J 15/34* (2006.01)
(52) U.S. Cl. ......... 277/306; 277/371; 277/377; 277/390
(58) Field of Classification Search .................. 277/306, 277/390, 258, 370, 371, 377, 374–375, 379, 277/392, 396
  See application file for complete search history.

(56) References Cited

U.S. PATENT DOCUMENTS

| | | | |
|---|---|---|---|
| 3,124,363 A * | 3/1964 | Cieslik | 277/375 |
| 4,434,986 A * | 3/1984 | Warner | 277/369 |
| 4,659,092 A | 4/1987 | Wallace et al. | |
| 5,076,589 A * | 12/1991 | Marsi | 277/394 |
| 5,149,249 A * | 9/1992 | Schellong et al. | 277/369 |
| 5,199,172 A * | 4/1993 | Runowski | 29/898.11 |
| 5,253,876 A * | 10/1993 | Gardner et al. | 277/408 |
| 5,443,274 A * | 8/1995 | Fuse | 277/390 |
| 5,556,110 A * | 9/1996 | Marsi et al. | 277/397 |
| 5,700,013 A * | 12/1997 | Baty | 277/340 |
| 5,820,129 A * | 10/1998 | Reagan | 277/314 |
| 6,494,460 B2 * | 12/2002 | Uth | 277/399 |
| 6,561,515 B1 * | 5/2003 | Bjornson | 277/358 |
| 7,144,015 B2 * | 12/2006 | Roberts-Haritonov et al. | 277/361 |
| 7,229,076 B2 * | 6/2007 | Kudari et al. | 277/361 |
| 7,249,768 B2 * | 7/2007 | Keba | 277/408 |
| 2002/0074731 A1 | 6/2002 | Uth | |
| 2002/0074732 A1 * | 6/2002 | Burroughs | 277/390 |
| 2003/0122313 A1 * | 7/2003 | Takahashi | 277/358 |
| 2005/0189722 A1 | 9/2005 | Roddis | |
| 2007/0235945 A1 * | 10/2007 | Casucci et al. | 277/390 |

OTHER PUBLICATIONS

Eaton Aerospace Booklet for Resilient Metal Seals, TF100-35, Dec. 2007, pp. 1-55.

* cited by examiner

*Primary Examiner* — Vishal Patel
(74) *Attorney, Agent, or Firm* — Holland & Hart, LLP

(57) ABSTRACT

A high temperature dynamic seal and methods of assembly and use. The dynamic seal is provided as a rotating seal, which includes a stationary ring and rotating ring assembly, with a seal ring that is positioned between the stationary ring member and the rotating ring assembly. One or more high temperature seals create a seal between the stationary ring member and a device in which the dynamic seal is used. Similarly one or more high temperature seals create a seal between the rotating ring assembly and a rotating shaft of the device. One or more of the high temperature seals are formed from a metallic material with various cross-sectional shapes.

24 Claims, 1 Drawing Sheet

HIGH TEMPERATURE DYNAMIC SEAL

CROSS-REFERENCE TO RELATED PATENT APPLICATIONS

Figure 2:
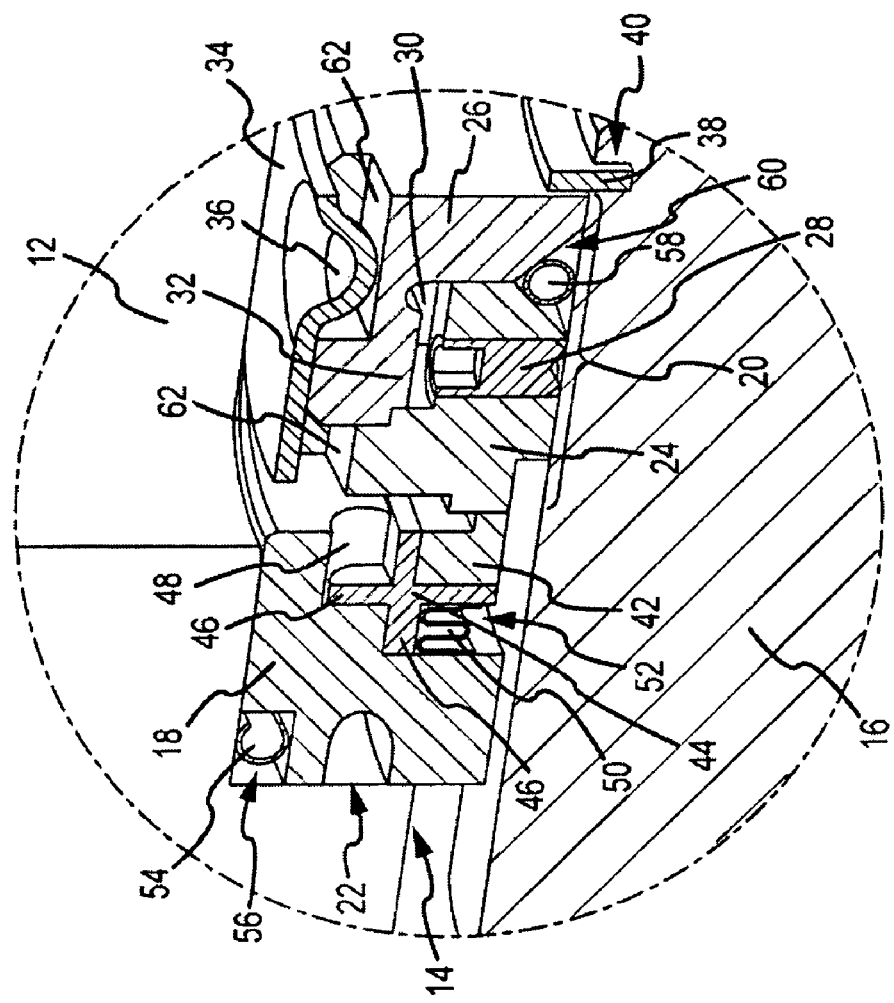

The invention claims priority from U.S. Provisional Patent Application No. 61/040,499 entitled HIGH TEMPERATURE DYNAMIC SEAL by: Mark S. Whitlow; Jeff Noll; Kevin Lamb; Jeff D. Farris; Fernando Lopez; Paul Richard Ryan; Roger Sanderson; Mark Vincent Chester; and Robert Vincent McGovern, filed on Mar. 28, 2008, which Provisional patent application is hereby incorporated by reference in its entirety.

BACKGROUND

In numerous applications, and in particular for combustion engine components, such as gearbox output shafts, crankshafts, and the like, rotary shafts are generally fitted with dynamic seals to prevent the leakage of oil and other fluids between the shaft and the opening in an outer housing through which the shaft passes. Such dynamic seals have been provided in a wide array of configurations and formed from numerous different materials. In a common arrangement, a stationary ring is coupled with the housing and a rotating ring assembly is coupled with the shaft. The stationary ring and rotating ring are placed in sealing engagement with one another. A plurality of seals are positioned at several different locations, according to the configuration of the stationary and rotating rings, to prevent the passage of fluid or debris passed the stationary and rotating rings, either between the components themselves or the components and the shaft or housing. Commonly, these seals are comprised of an elastomeric material, chosen to provide adequate sealing engagement with the application of minimal pressure and expense.

However, prior dynamic seals for rotating equipment have been limited to relatively low maximum service temperatures, which directly correlate with the maximum service temperature of the elastomeric/polymer seals used in the construction and installation of the dynamic seals. This has limited the use of common dynamic seal designs in particular applications that experience periodic to sustained temperatures in excess of the maximum service temperatures of conventional elastomeric/polymer materials.

SUMMARY

This Summary is provided to introduce a simplified selection of some concepts that are further described below in the Detailed Description. This Summary and the Background are not intended to identify key aspects or essential aspects of the claimed subject matter. Moreover, this Summary is not intended for use as an aid in determining the scope of the claimed subject matter.

A high temperature dynamic seal is presented in various embodiments that include various methods of use and assembly. In one aspect, the dynamic seal includes a stationary ring member that is operatively coupled with an outer housing of a device. A rotating ring assembly is operatively coupled with a rotating shaft associated with the device. A seal ring is positioned between the stationary ring member and the rotating ring assembly in a manner that permits a sealing engagement between the stationary ring member and the rotating ring assembly. In various embodiments, one or more high temperature seals are positioned to create a seal between the stationary ring member and the housing. Several embodiments position one or more high temperature seals between the rotating ring assembly and the rotating shaft, creating a sealing engagement between these structures. In one aspect, one or more of the high temperature seals are formed from a metallic material.

In one aspect, the high temperature seals are formed to have various cross-sectional shapes that may form O-seals, C-Seals, E-seals, among other desired geometries. Some embodiments may, for example, include a metal C-seal between the stationary ring and the housing. Some embodiments may position a metal O-seal between the rotating ring assembly and the rotating shaft. In some embodiments, a seal spring is positioned to bias the seal ring into a sealing engagement. In at least one aspect, the seal ring is supported by a seal ring carrier and the seal spring exerts force against the seal ring carrier. In another aspect, the spring seal is provided in the form of an E-seal and a metal E-seal which seals between the stationary ring and the seal ring. The E-seal may also provide-spring force that assists in forming a seal between the faces of the seal ring and inner rotating housing.

These and other aspects of the present system and method will be apparent after consideration of the Detailed Description and Figures herein. It is to be understood, however, that the scope of the invention shall be determined by the claims as issued and not by whether given subject matter addresses any or all issues noted in the Background or includes any features or aspects recited in this Summary.

DRAWINGS

Non-limiting and non-exhaustive embodiments of the present invention, including the preferred embodiment, are described with reference to the following figures, wherein like reference numerals refer to like parts throughout the various views unless otherwise specified.

Figure 1:
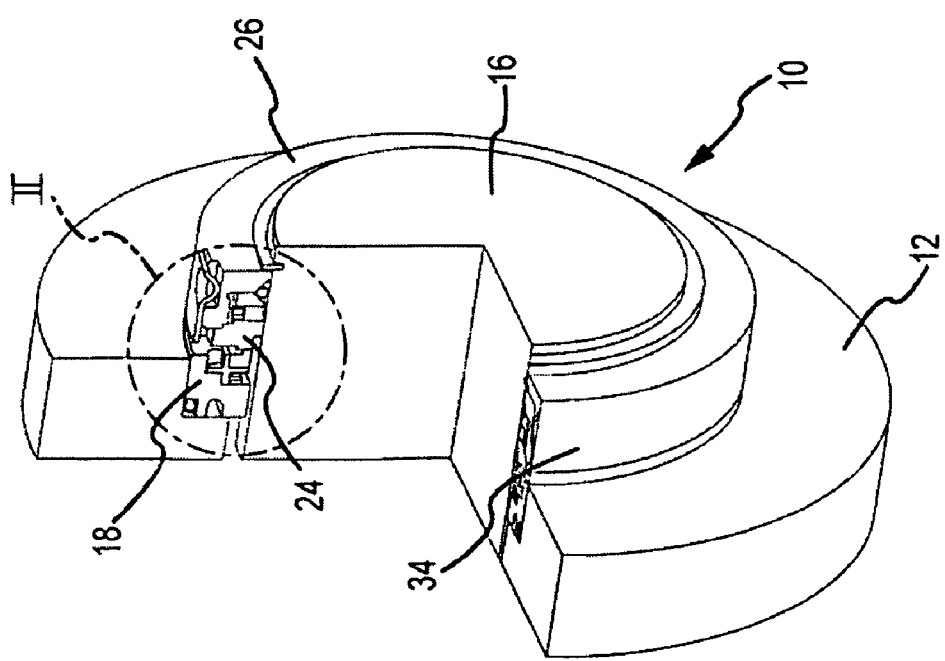

FIG. 1 depicts a partial, cut-away view of one embodiment of the high temperature dynamic seal in one contemplated application; and FIG. 2 depicts an isometric, cross-sectional view of the high temperature dynamic seal of FIG. 1.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the technology. However, embodiments may be implemented in many different forms and should not be construed as being limited to the embodiments set forth herein. The following detailed description is, therefore, not to be taken in a limiting sense.

A high temperature dynamic seal of the present technology may be provided in a number of different embodiments that include rotary seals, reciprocating seals, and the like. With reference to FIG. 1, at least one embodiment of the dynamic seal 10 is provided as a rotating seal for use with one of various types of rotating equipment. For example purposes only, the dynamic seal 10 is depicted as being used with a device, such as a gearbox, that may be associated with an internal combustion engine. In such an example, the gearbox will be provided with an external housing 12 with an opening 14 through which a rotating shaft 16 will at least partially extend.

In various aspects, a dynamic seal 10 according to the present technology, may be provided with a stationary ring 18 and a rotating ring assembly 20 that operatively engage one another to form a seal between the housing 12 and the rotating shaft 16, proximal the opening 14 within the housing. In one aspect, the stationary ring 18 may be at least partially disposed within a recess 22 formed within the housing 12, adjacent the opening 14. It is contemplated that such a stationary ring 18 may be permanently or removably coupled with the housing 12 in various known methods that include press-fitting the stationary ring 18 within the housing 12, adhering the stationary ring 18 using various known adhesives, and the like.

In some embodiments, the rotating ring assembly 20 may be formed from an inner rotating ring 24 and an outer rotating ring 26 that are selectively secured with one another. In at least one embodiment, the inner rotating ring 24 is secured about an external surface of the rotating shaft 16 so that the inner rotating ring 24 is positioned closely adjacent the stationary ring 18 in a use position. Various securement means, including set screws 28 or other such mechanical fasteners, may be used to removably couple the inner rotating ring 24 with the rotating shaft 16. With reference to FIG. 2, an end portion 30 of the inner rotating ring 24 and an end portion 32 of the outer rotating ring 26 may be provided with mirroring step-shaped features that enable one to partially nest within the other. In such an orientation, an outer surface of both the inner rotating ring 24 and outer rotating ring 26 remain exposed. In one aspect, the end portion 30 of the inner rotating ring 24 and the end portion 32 are provided with mating threads to secure the structures with one another. In other embodiments, the outer rotating ring 26 may be coupled with the inner rotating ring 24 using various mechanical fasteners, adhesives, and the like.

In various embodiments, a locking ring 34 may be positioned along the outwardly facing surfaces of the inner rotating ring 24 and the outer rotating ring 26. A locking ring détente 36, or other mechanical fastener, may be used to be received within a recess, such as a spanner slot, formed in the outer rotating ring 26 to operatively secure the locking ring 34 with the rotating ring assembly 20. Similarly, a retaining ring 38 or other mechanical détente may be provided to be partially received within a channel 40 or other recess formed into the rotating shaft 16 near a distal end portion of the rotating ring assembly 20. In this manner, longitudinal movement of the rotating ring assembly 20 along a length of the rotating shaft 16 may be substantially prevented, encouraging a sealing engagement with the stationary ring 18.

In some embodiments, sealing engagements are attained between the stationary ring 18 and the rotating ring assembly 20 through the use of a seal ring 42. In at least one embodiment, the seal ring 42 is disposed between the stationary ring 18 and the rotating ring assembly 20 so that a rotatable seal is attained between the structures. It is contemplated that the seal ring 42 may be provided in a generally fixed position with respect to either or both the stationary ring 18 and the rotating ring assembly 20. However, in some embodiments, the seal ring 42 is positioned in a manner that permit the seal ring 42 to move between the stationary ring 18 and the rotating ring assembly 20 over a length of the rotating shaft 16. In one aspect, such a position may be attained through the use of a seal ring carrier 44 that may be removably secured within a cavity between the stationary ring 18 and the rotating ring assembly 20. With reference to the embodiment depicted in FIG. 2, the cavity may be at least partially defined by cavity 48 and recess 52, which are depicted as being in open communication with one another. In at least one embodiment, depicted in FIG. 1, the seal ring carrier 44 is provided with a plurality of arm members 46 that extend outwardly from a central portion of the seal ring carrier. The seal ring carrier 44 may include a variety of different numbers and configurations of arm members 46. In some embodiments, the seal ring carrier may be provided with four arm members 46 that are oriented approximately ninety degrees from one another to form an "X" or "+" shape. In one aspect, the arm members 46 may be provided to serve to limit certain movement of the seal ring with respect to the stationary ring 18 and the rotating ring assembly 20. In the depicted, exemplary embodiment, the one arm member 46 that extends away from the rotating shaft 16 is provided as an anti-rotation tab which, when the seal ring carrier 44 is placed in a use position with respect to the stationary ring 18, engages an anti-rotation cavity 48 formed in the stationary ring 18. In this orientation, rotational movement of the seal ring carrier 44 is substantially limited. The arm member extending generally parallel with the rotating shaft 16 and toward the stationary ring 18 serves as a positive stop that limits movement of the seal ring 42 toward the stationary ring 18. Other arm members 46 extending from the seal ring carrier 44, such as those extending toward the rotating shaft and the rotating ring assembly 20, may be provided with a shape and orientation that securably engage adjacent surfaces of the seal ring 42 when it is in its use position. Various known methods that include mechanical fasteners, adhesives, and the like may be used to secure the seal ring 42 with the seal ring carrier 44.

It is contemplated that, in some embodiments, the positioning of the stationary ring 18 within the housing 12 and the static positioning of the rotating ring assembly 20 with respect to the rotating shaft 16 may alone provide a sufficient compression force against the seal ring 42 to create an adequate seal for various intended uses. However, in some embodiments, a biasing member 50 may be disposed closely adjacent the seal ring 42 in a partially or fully compressed form. The positioning of the biasing member 50 will produce favorable results where the compression forces exerted further add a compressing force against the seal ring 42 into an opposing structure, such as the rotating ring assembly 20 in the depicted, exemplary embodiment. This will help to dictate and control the initial degree of linear travel of the seal ring 42 between the stationary ring 18 and the rotating ring assembly 20. In some embodiments, the biasing member 50 may be positioned within a recess 52 that is open to the rotating shaft 16 and defined by a face of the stationary ring 18 and one or more arm members 46 of the seal ring carrier 44. One or more arms 46 of the seal ring carrier 44 may be positioned to extend toward portions of the stationary ring 18 to serve as a positive stop that prevents over compression of the biasing member 50 positioned between the stationary ring and the seal ring carrier.

The biasing member 50 may be provided in a wide array of shapes, including the E-seal/spring depicted in FIG. 1. The geometry of the biasing member 50 and its level of resilience may be particularly selected according to desired levels of added compression force against the seal ring 42. In any respect, it is merely desirable that sufficient compression force is imparted to the seal ring 42 so that a sealing face of the sealing ring 42 adequately engages an opposing sealing face within the dynamic seal 10. The biasing member 50 will, in many aspects, provide additional benefits. For example, the biasing member 50 will create a seal that substantially prevents fluid and debris from passing between the seal ring carrier 44 and the stationary ring 18, which would otherwise effectively bypass the seal ring 42 in the depicted configuration. Accordingly, in various embodiments, no sealing engagement or other contact is attained between the rotating shaft 16 and portions of the dynamic seal 10 associated with the stationary ring 18, seal ring carrier 44 and seal ring 42.

In many embodiments, it may be desirable to provide a plurality of seals to prevent the passage of various flowable materials and/or debris between the components of the dynamic seal 10 and the device to which it is coupled. For example, one or more seals 54 may be positioned between the stationary ring 18 and the housing 12. In some embodiments, the seal 54 may be positioned within a recess 56 formed at least partially within either or both the housing 12 and the stationary ring 18. Likewise, one or more seals 58 may be positioned between the rotating ring assembly 20 and the rotating shaft 16. In various embodiments, the seal 58 may be positioned within a recess 60 formed at least partially within either or both the rotating seal assembly 20 and the rotating shaft 16. In some embodiments, where the recess 60 is partially formed into the rotating seal assembly 20, it is contemplated that the recess 60 may be formed into either or both the inner rotating ring 24 and the outer rotating ring 26. However, an easier assembly may be attained where the recess 60 is formed in end portions of both the inner rotating ring 24 and the outer rotating ring 26, as depicted in FIG. 2.

It is contemplated that the seals 54 and 58 may be provided to have one or more different cross-sectional shapes. For example, a C-shaped seal, such as that depicted as being disposed between the stationary ring 18 and the housing 12, may be shaped and sized to provide an outwardly directed expansion force against the structures in order to increase the sealing engagement therebetween. However, one or more of the seals 54 and 58 may be provided with an O-shape, such as that depicted as being disposed between the rotating ring assembly 20 and the rotating shaft 16. Other various cross-sectional shapes may be provided to one or more of the seals 54 and 58 according to the structural characteristics of the device and the dynamic seal 10 or their intended uses and operating conditions.

In some aspects, the dynamic seal 10 may be used in various operations that experience periodic or sustained periods of high temperatures. It is contemplated that such high temperatures may extend beyond the service temperatures of most elastomeric materials. Accordingly, in some embodiments, the seal ring 42 may be formed from one or more various materials that will maintain sealing engagements between opposing structures at relatively high temperatures. Such materials may include carbon, graphite, silicone carbide and the like. In some aspects, the seals 54 and 58 may be provided in various materials that will remain serviceable in high temperature conditions. In some embodiments, the seals 54 and 58 may be formed from one or more various metallic materials. In some aspects, the seals 54 and 58 may be formed from stainless steel. In other aspects, the seals 54 and 58 may be formed from one of various nickel alloys, such as Inconel. These materials retain their serviceable nature as seals through a wider range of temperatures while further limiting the possibility of corrosion due to exposure to various materials and substances associated with the device to which the dynamic seal 10 is coupled. Similarly, the biasing member 50 may be formed from such metallic materials, thus providing the aforementioned attributes as well as various enhanced degrees of resiliency.

In at least one method of assembly, a seal 54, such as the compressible C-seal depicted, may be associated with an outward facing surface of the stationary ring 18. In one aspect, the C-seal is friction fit along an exterior surface of the stationary ring. The stationary ring 18 may then be positioned within the housing opening 14. In one aspect, the stationary ring 18 is slip-fit within the housing 12, with the seal 54 coming into a frictional engagement with an inwardly facing surface of the housing 12. With the seal ring 42 secured to the seal ring carrier 44, the seal ring carrier 44 may be placed into position with respect to the stationary ring 18. The biasing member 50 may be positioned between an arm 46 of the seal ring carrier 44 and the stationary ring 18.

The rotating ring assembly 20 may then be secured with the rotating shaft 16, closely adjacent the seal ring 42 and stationary ring member 18. In one aspect, an inner rotating ring 24 may be slid axially along a length of the rotating shaft 16 until an engagement face of the inner rotating ring 24 comes into contact with a sealing face associated with the seal ring 42. A load may be placed on the inner rotating ring 24, so as to engage the seal ring 42 and seal ring carrier 44, compressing the biasing member 50. In at least one embodiment, a set screw 28 or other such fastener may then be used to releasably secure the inner rotating ring 24 with the rotating shaft 16. A seal 58, such as the metal O-ring seal depicted in the exemplary embodiments, may then be positioned about the rotating shaft 16, closely adjacent the inner rotating ring 24, within a biased cavity or recess 60 formed in the inner rotating ring 24. An outer rotating ring 26 may then be secured with the inner rotating ring 24 about the rotating shaft 16, such as through threaded engagements or the use of various mechanical or adhesive fastening means. A biased cavity or recess 60 may be provided in the outer rotating ring member 26 to mirror the biased cavity in the inner rotating ring member 24. In one aspect, the shapes of the two biased cavities are provided to accept the seal 58 and, when the inner rotating ring 24 and outer rotating ring 26 are secured with one another, compress the seal 58 against the rotating shaft 16 and the biased cavities. In some embodiments, a locking ring 34 may then be positioned over the rotating ring assembly 20, and secured thereto by means of a détente 36 that extends at least partially within a recess, such as the spanner slot 62 formed within the rotating ring assembly 20. Other mechanical and adhesive fastening means are contemplated, however, for securing these structures with one another.

Although the dynamic seal 10 has been described in language that is specific to certain processes and methodological steps, it is to be understood that the invention defined in the appended claims is not necessarily limited to the specific processes, and/or methodological steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein.

What is claimed is:

1. A seal assembly for use with rotating equipment that includes a housing and a rotating shaft, the seal assembly comprising:

a stationary ring coupled with the housing; the rotating shaft passing through the stationary ring;

a rotating ring assembly secured about a portion of the rotating shaft exterior of the housing and closely adjacent the stationary ring; the rotating ring assembly including an inner rotating ring and an outer rotating ring that are operatively secured with one another;

a seal ring carrier positioned to permit linear movement with respect to a length of the rotating shaft between the stationary ring and the rotating ring assembly, the seal ring carrier including a plurality of integrally formed arm members that extend outwardly from a central portion of the seal ring carrier, wherein at least one arm member extends into an anti-rotation cavity formed in the stationary ring, whereby rotational movement of the seal ring carrier is substantially limited;

a seal ring coupled with the seal ring carrier between the stationary ring and the rotating ring assembly; wherein the seal ring contacts the inner rotating ring; and a biasing member positioned adjacent the seal ring carrier, within a recess defined at least partially by a face of the stationary ring and one or more arm members of the seal ring carrier, wherein said biasing member provides a seal between the ring carrier and the stationary ring.

2. The seal assembly of claim 1 wherein:
the seal ring carrier includes four arm members that are oriented approximately ninety degrees from one another.

3. The seal assembly of claim 1 wherein:
a surface of at least one arm member extending from the seal ring carrier is secured to a surface of the seal ring in a use position.

4. The seal assembly of claim 1 wherein: surfaces of at least two arm members extending from the seal carrier are secured to at least two surfaces of the seal ring in a use position.

5. The seal assembly of claim 1 wherein:
at least one arm of the seal ring carrier extends from the seal ring carrier, generally parallel with the rotating shaft, away from the rotating seal assembly and toward the stationary ring; the at least one arm being positioned to be in contact with a portion of the stationary ring, whereby limiting compression of the biasing member.

6. The seal assembly of claim 1 wherein:
an end portion of the inner rotating ring and an end portion of the outer rotating ring are shaped to enable one of the end portions to at least partially nest within the other.

7. The seal assembly of claim 6 wherein:
the inner rotating ring is secured about an external surface of the rotating shaft with at least one mechanical fastener.

8. The seal assembly of claim 6 further comprising:
a retaining ring at least partially disposed within a channel formed into the rotating shaft adjacent a distal end portion of the rotating ring assembly, whereby longitudinal movement of the rotating ring assembly along a length of the rotating shaft is substantially prevented.

9. The seal assembly of claim 6 further comprising:
a locking ring positioned along surfaces of the inner rotating ring and the outer rotating ring.

10. The seal assembly of claim 9 wherein:
a locking ring detent is formed in the locking ring; the locking ring detent being at least partially received within a recess formed in the outer rotating ring, whereby the locking ring is secured with the rotating ring assembly.

11. The seal assembly of claim 1 further comprising:
one or more seals positioned between the stationary ring and the housing.

12. The seal assembly of claim 11 wherein:
the one or more seals positioned between the stationary ring and the housing are comprised of metal and formed to have a C-shaped cross-section.

13. The seal assembly of claim 1 further comprising:
one or more seals positioned between the rotating ring assembly and the rotating shaft.

14. The seal assembly of claim 13 further comprising:
the one or more seals positioned between the rotating ring assembly and the rotating shaft are comprised of metal and formed to have an O-shaped cross-section.

15. The seal assembly of claim 13 further comprising:
the one or more seals positioned between the rotating ring assembly and the rotating shaft are positioned within a recess formed at least partially within the inner rotating ring and the outer rotating ring.

16. A method of providing a seal between a housing and a rotating shaft, the method comprising:
positioning a stationary ring within the housing, around the rotating shaft;

coupling a seal ring carrier with the stationary ring, around the rotating shaft, with at least one arm member integrally formed with the seal ring carrier that extends into an anti-rotation cavity formed in the stationary ring, whereby rotational movement of the seal ring carrier is substantially limited;

coupling a seal ring with the seal ring carrier, around the rotating shaft;

positioning a biasing member adjacent the seal ring carrier, within a recess defined at least partially by a face of the stationary ring and the seal ring carrier, wherein said biasing member provides a seal between the seal ring and the stationary ring;

securing an inner rotating ring with a surface of the rotating shaft exterior of the housing and closely adjacent the seal ring and stationary ring member, whereby a surface of the seal ring contacts a sealing face of the inner rotating ring; and securing an end portion of an outer rotating ring with an end portion of the inner rotating ring.

17. The method of claim 16 further comprising:
positioning a housing seal about the rotating shaft, against the housing, prior to the step of positioning a stationary ring within the housing, whereby the housing seal is operatively coupled with the housing and the stationary ring after positioning a stationary ring within the housing.

18. The method of claim 16 further comprising:
coupling a shaft seal about the rotating shaft, closely adjacent a recess formed in the inner rotating ring, prior to the step of securing an end portion of an outer rotating ring with an end portion of the inner rotating ring, whereby the shaft seal is operatively coupled with the rotating shaft, a face of the recess of the inner rotating ring, and a face of a recess formed in the outer rotating ring after securing an end portion of an outer rotating ring with an end portion of the inner rotating ring.

19. The method of claim 16 further comprising:
positioning the biasing member between the stationary ring and the seal ring carrier, at least prior to the step of securing an inner rotating ring with a surface of the rotating shaft exterior of the housing.

20. The method of claim 19 further comprising:
placing a load on the inner rotating ring, engaging the seal ring and at least slightly compressing the biasing member, prior to the step of securing the inner rotating ring with a surface of the rotating shaft exterior of the housing.

21. The method of claim 16 further comprising:
securing the inner rotating ring with the rotating shaft using at least one set screw.

22. The method of claim 16 further comprising:
securing a locking ring along surfaces of the inner rotating ring and the outer rotating ring, after the step of securing an end portion of the outer rotating ring with an end portion of the inner rotating ring.

23. The method of claim 16 further comprising:
positioning a retaining ring at least partially within a channel formed into the rotating shaft adjacent a distal end portion of the rotating ring assembly, after the step of securing an end portion of the outer rotating ring with an end portion of the inner rotating ring.

24. A seal assembly for use with rotating equipment that includes a housing and a rotating shaft, the seal assembly comprising:
a stationary ring coupled with the housing and including an anti-rotation cavity formed therein, wherein the rotating shaft passes through the stationary ring;
a rotating ring assembly secured about a portion of the rotating shaft exterior of the housing and closely adjacent the stationary ring, wherein the rotating ring assembly includes an inner rotating ring and an outer rotating ring that are operatively secured with one another;
a seal ring carrier, positioned between the stationary ring and the rotating ring assembly, the seal ring carrier including at least one arm member integrally formed therewith and extending into the anti-rotation cavity, whereby rotational movement of the carrier is substantially limited;
a seal ring coupled with the seal ring carrier between the stationary ring and the rotating ring assembly, wherein the seal ring contacts the inner rotating ring; and
a biasing member positioned adjacent the seal ring carrier, within a recess defined at least partially by a face of the stationary ring and one or more arm members of the seal ring carrier, wherein the biasing member is operative to provide a seal between the seal ring carrier and the stationary ring.

\* \* \* \* \*